UNITED STATES PATENT OFFICE.

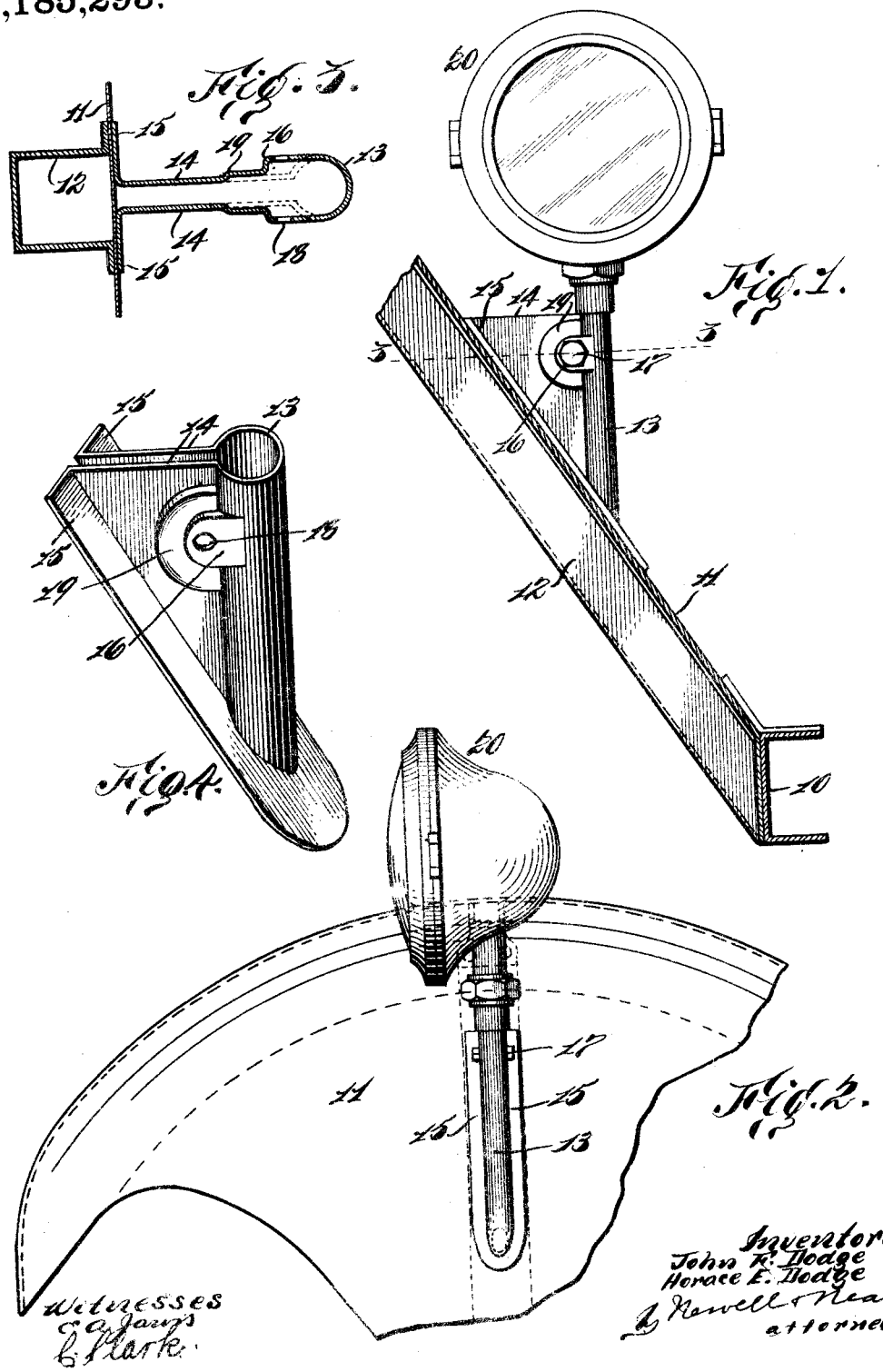

JOHN FRANK DODGE, OF DETROIT, AND HORACE E. DODGE, OF GROSSE POINTE, MICHIGAN.

LAMP-BRACKET.

1,185,293.  Specification of Letters Patent.  Patented May 30, 1916.

Original application filed August 19, 1914, Serial No. 857,484. Divided and this application filed December 20, 1915. Serial No. 67,748.

*To all whom it may concern:*

Be it known that we, JOHN F. DODGE and HORACE E. DODGE, citizens of the United States, residing at Detroit and Grosse Pointe, Michigan, respectively, have invented certain new and useful Improvements in Lamp-Brackets, of which the following is a clear, full, and exact description.

This invention relates to lamp brackets for supporting the lamps such as are used on motor cars, and one of the objects of the invention is to provide an improved construction of lamp bracket adapted to be placed upon the fender apron so as not to obstruct the view of the driver, and which will permit the lamp to cast its light within a desirable area.

Another object is to provide a conduit for the light wires leading to the lamp, by bending the bracket up from sheet metal.

A further object is to provide a very light lamp bracket, although it is sufficiently strong and rigid to avoid vibration of the lamp.

Other objects are to provide a simple, practical and efficient lamp bracket.

These being among the objects of the present invention, the same consists of certain features of construction and combinations of parts to be hereinafter described and then claimed with reference to the accompanying drawings illustrating a desirable embodiment of the invention in which—

Figure 1 is a transverse section of fender parts of an automobile on which the improved lamp bracket is shown in elevation as supporting a lamp; Fig. 2 is a side elevation of the same parts partly broken away; Fig. 3 is a transverse section on the line 3—3 Fig. 1, the parts being enlarged; and Fig. 4 is a perspective view of the improved lamp bracket, as preferably constructed.

This application is a division of an earlier application filed August 19th, 1914, Serial No. 857,484.

In the drawings are shown a part 10 of the frame of the car, a part 11 of the fender apron, and a part 12 of the bracket which extends from the frame 10 and supports the fender apron in inclined position. These parts may obviously be of any desired construction.

So far as we are aware, it is new in this art to construct from spring sheet metal a bracket having a socket for receiving the post or supporting part on which a lamp is mounted, said bracket being so constructed and adapted to be arranged in such a position upon the fender apron that at the same time it does not obstruct the view of the driver and will permit the lamp to cast its light within a desirable area.

The preferred construction of lamp bracket is as follows: The bracket is composed of sheet metal of a suitable springy character and bent up into the required shape to provide a tubular lamp socket 13, side or cheek plates 14 which extend laterally therefrom, and outwardly extending side flanges 15 bent up from said plates. The said flanges 15 are inclined with respect to the socket 13 so that their inclination corresponds to the inclination of the upper surface of the fender apron 11, and when the said flanges are secured to said apron the lamp socket 13 will extend vertically. Said lamp bracket is fixed to the fender apron between its upper and lower edges, with the lamp socket 13 located nearer the frame 10 of the car than are the side plates or flanges 15. The flanges 15 may be spot welded or riveted to the fender apron, or secured to the apron in any desired manner. It will also be seen that the lamp bracket is provided with struck up portions 16, which are separated by a distance corresponding substantially with the diameter of the socket 13, and being located at opposite sides of the socket they provide seats for the head and nut of a retaining bolt 17 which is inserted through perforations 18 in said struck up portions. Preferably the cheek plates 14 are provided with slightly struck up portions 19, from which the before mentioned struck up portions 16 are formed. As the said bracket is composed of springy material, it lends itself well to the removal and fixing of the lamp rigidly in position. When the lamp post or supporting part is removed from the socket, the bolt 17 will of course be loosened, and the said socket will then be expanded by the springy character of the bracket, but when the said post or supporting part is inserted in the socket, the latter may be contracted upon the same by tightening up the bolt. This will rigidly secure the lamp 20 in the desired position. The described construction of lamp bracket is simplicity itself, and it is composed preferably of one piece of metal which is bent up to the shape required for securing the base flanges 15 of the bracket to the inclined fender apron while the socket 13 extends vertically for properly supporting the lamp. No parts can work loose as the bolt itself is rendered tighter by reason of the spreading action of the contracted spring bracket.

An important object of the present invention is to provide a conduit for the light wires to the lamp, such as 20. It is only necessary to provide a hole 21 in the fender apron 11, as indicated by dotted lines in Fig. 2, at the bottom of the socket 13 which forms said conduit.

It is obvious that the present invention is susceptible of modification, as parts may be omitted, added and substituted without departing from the spirit and scope thereof as claimed.

What we claim as new is:—

1. In a device of the class described, a base, and a bracket composed of formed sheet metal and having a socket open at one side but otherwise closed and normally sprung into free expanded condition by the springiness of said sheet metal, duplex means at one side of said socket for rigidly mounting said bracket in using position on said base, and duplex freely acting means extending between said mounting means and the said open side of said socket for contracting said socket as a whole upon a supporting part of an object.

2. In a device of the class described, the combination of a base having a hole therein, and a bracket composed of sheet metal, having a free contractile socket for holding an object, resilient cheek plates extending laterally from said socket, and means for rigidly mounting said cheek plates on said base, whereby said socket is positioned in line with said hole, and between which said socket and mounting means said cheek plates extend, said socket constituting a conduit for electrical conductors which may pass through said hole.

3. A device of the class described, composed of formed sheet metal, having a free, contractile socket, resilient cheek plates extended laterally from said socket, said cheek plates being inclined to said socket at their lower extremities and provided with means for mounting said bracket in using position, and means operating on said cheek plates for contracting said socket as a whole upon a supporting part for an object.

4. A device of the class described, composed of formed sheet metal, having a socket, and cheek plates extended laterally from said socket, said cheek plates having flanges, which extend at an inclination to said socket.

5. A device of the class described, composed of a formed piece of springy sheet metal and comprising a socket, spaced cheek plates extending laterally from the sides of said socket, means for securing the cheek plates to a support, and means for compressing said cheek plates, whereby said socket is contracted to engage and bind a part on said bracket.

6. A device of the class described, composed of a formed piece of springy sheet metal and comprising a socket, spaced cheek plates extending laterally from the sides of said socket, side flanges on said cheek plates extending at an inclination to said socket, for securing the cheek plates to a support, and a through bolt for compressing said cheek plates, whereby said socket is contracted to engage and bind a part on said bracket.

7. A device of the class described, composed of formed sheet metal, portions of which are substantially closed together to provide a separating space, while a vertically elongated socket is formed to one side of said closed portions, said space extending in one plane away from said socket, and means at the other side of said closed portions and at each side of said plane for rigidly mounting the aforesaid parts in using position.

Signed at Detroit, Mich., this 15th day of December, 1915.

JOHN FRANK DODGE.
HORACE E. DODGE

Witness:
ALFRED H. KNIGHT.

Correction in Letters Patent No. 1,185,293.

It is hereby certified that Letters Patent No. 1,185,293, granted May 30, 1916, upon the application of John Frank Dodge, of Detroit, and Horace E. Dodge, of Grosse Pointe, Michigan, for an improvement in "Lamp-Brackets," were erroneously issued to said inventors, whereas said Letters Patent should have been issued to *Dodge Brothers, of Detroit, Michigan, a corporation of Michigan*, said corporation being owner of the entire interest in said invention, as shown by the record of assignments in this office; and that the said Letters Patent should be read with this correction therein that the same may conform to the record of the case in the Patent Office.

Signed and sealed this 27th day of June, A. D., 1916.

[SEAL.]

R. F. WHITEHEAD,

*Acting Commissioner of Patents.*